United States Patent [19]

Skogman et al.

[11] Patent Number: 4,567,088
[45] Date of Patent: Jan. 28, 1986

[54] SANDWICH MATERIAL

[75] Inventors: Bengt G. Skogman; Hans T. Svensson; Eduardo E. Torres, all of Karlstad, Sweden

[73] Assignees: Karlstad Vulk; Montage Aktiebolag, both of Karlstad, Sweden

[21] Appl. No.: 664,394

[22] Filed: Oct. 23, 1984

[30] Foreign Application Priority Data

Nov. 11, 1983 [SE] Sweden ................ 8306207

[51] Int. Cl.⁴ .................. B32B 7/02; B32B 27/40
[52] U.S. Cl. .................... 428/213; 428/217; 428/422; 428/423.1; 428/423.9
[58] Field of Search ............ 428/217, 422, 465, 423.1, 428/423.9, 522, 213

[56] References Cited

U.S. PATENT DOCUMENTS 4,101,704  7/1978  Hiles ................. 428/218

FOREIGN PATENT DOCUMENTS 2415854  9/1979  France ................ 428/217
58-118373  7/1983  Japan ................ 428/217

Primary Examiner—Paul J. Thibodeau
Attorney, Agent, or Firm—Murray, Whisenhunt and Ferguson

[57] ABSTRACT

A sandwich material is characterized in that it comprises at least three layers, viz a first layer (12), constituting a wear layer, consisting of a polymeric substance with a hardness of between 85° and 100° Shore A, a second layer (9) consisting of rubber with a hardness of between 50° and 70° Shore A, but softer than said first layer, and a third layer (10) consisting of rubber with a hardness of between 20° and 50° Shore A, but softer than said second layer, said second layer being located between said first and third layers.

15 Claims, 3 Drawing Figures

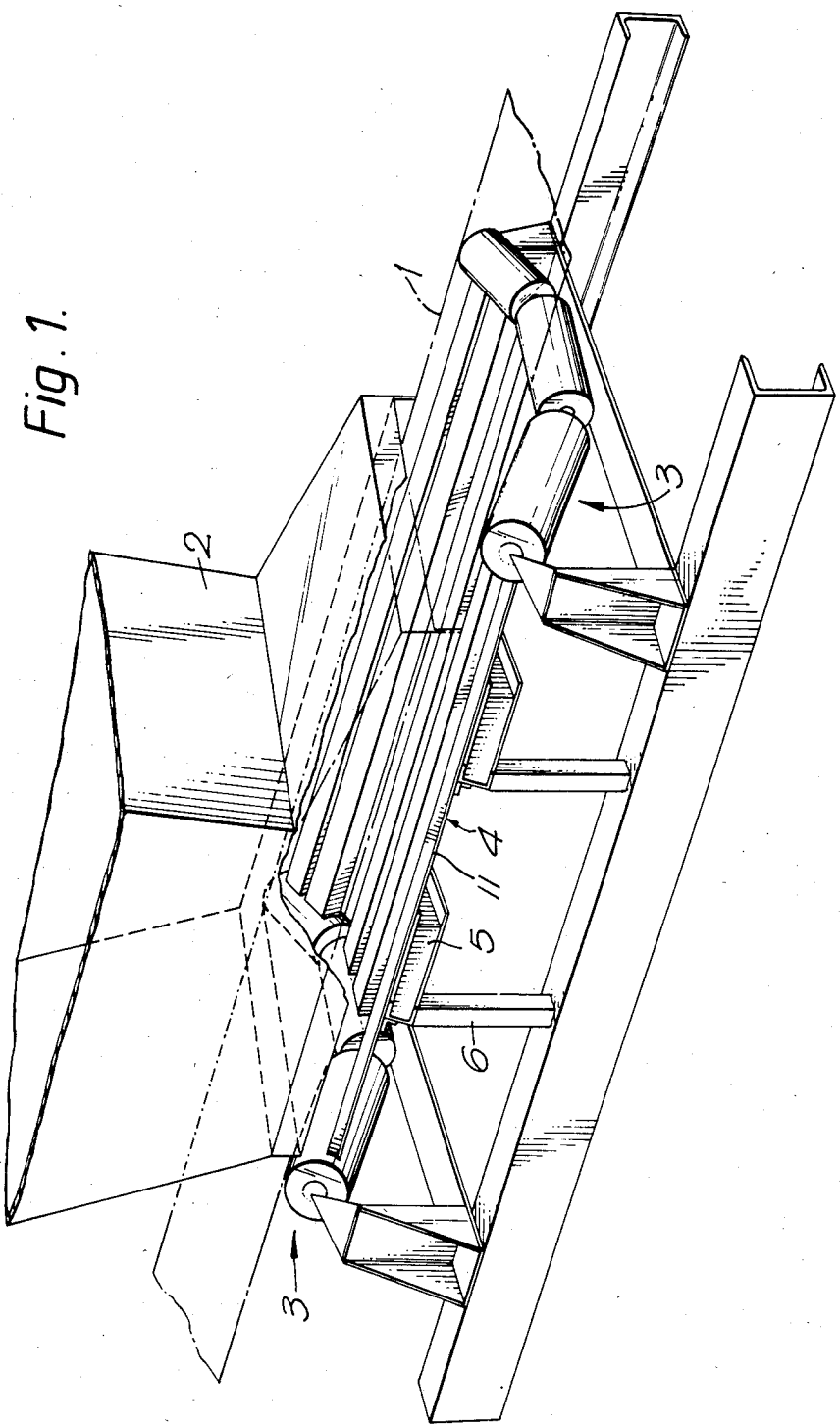

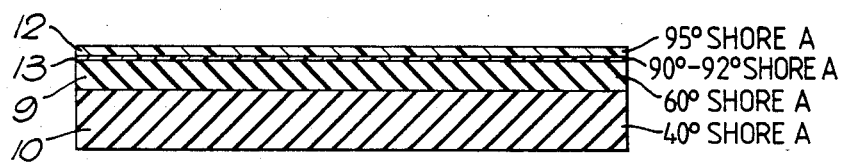
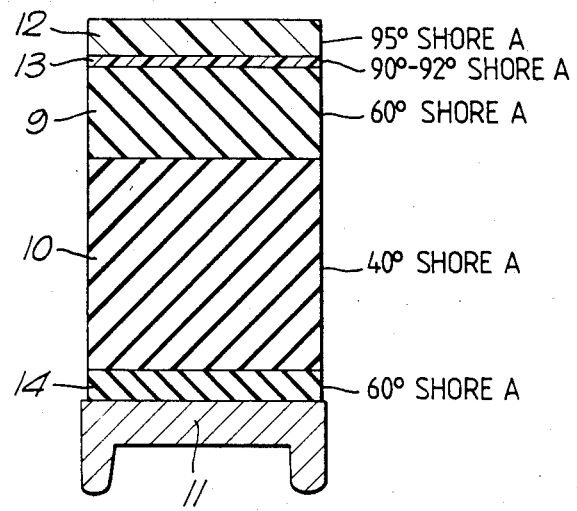

SANDWICH MATERIAL

TECHNICAL FIELD

The invention relates to a sandwich material for different applications. The material may for example be used to coat metal surfaces exposed to abrasion by heavy goods, such as in the quarring and ore industry to coat shafts, chutes, hoppers, scales, truckbeds etc; and in the wood industry for noise damping log handling. The sandwich material according to the invention is especially advantageous as a shock absorbing and resilient material under conveyor belts at the point of loading.

BACKGROUND ART

The use of sandwich rubber to cover surfaces which are exposed to abrasion by heavy goods is increasing. A sandwich material known in the art comprises two different rubber qualities, one with a hardness of 60° Shore A and another with a hardness of 40° Shore A. This composite material is considerably superior to homogenous materials, as the harder rubber layer resists the hard and sharp edges of the goods, while the softer layer is considerably more resilient and therefore may yield. This provides for a considerable reduction of damage due to crushing and fatigue, while at the same time the thickness of the material may be reduced. In spite of these considerable advantages of the existing sandwich rubber material there is a strive for better materials to satisfy the demands of the market for greater impact resistance and consequent increased working life and/or lower weight and other positive properties.

Another known technique is to coat rubber with a thin layer of polyethylene in order to combine the low friction of the polyethylene with the ability of the rubber to absorb shocks and blows. This material has been used inter alia as a supporting material under conveyor belts at the loading point. One drawback of the material is that it must be comparatively thick, and consequently becomes heavy and occupies valuable space. Further, the polyethylene layer has proven to expand as a result of blows, in the end leading to a separation of the polyethylene layer from the rubber layers. This is a serious drawback. In addition, polyethylene has a low resistance to abrasion, which may result in a quick scuffing of the surface layer. This is especially serious because it is virtually impossible to renew the polyethylene layer by spraying on a new one or elsewise equally simple, the complete replacement of the entire material being required instead.

DISCLOSURE OF THE INVENTION

The purpose of the invention is to provide an improved sandwich material. More particularly it is a purpose to provide a material which is further improved, as far as resilience and shock absorbance are concerned, in comparison with known rubber sandwich materials, consisting of two rubber layers of different hardnesses. More specifically, a purpose is to provide a material which absorbs and distributes each blow ideally.

A purpose of the invention is also to provide a material which is well suited for a supporting element underneath a conveyor belt at the point of loading. In particular, a purpose is to provide a material with low friction between the supporting element and the conveyor belt as well as with high abrasion resistance and shock absorbance.

These and other purposes are served by providing the material with at least three layers, i e a first, surface layer consisting of a polymeric substance with a hardness of between 85° and 100° A, a second layer consisting of rubber with a hardness of between 50° and 70° Shore A, but softer than the first layer, and a third layer consisting of rubber with a hardness of between 20° and 50° Shore A, but softer than the second layer, said second layer being situated between said first and said third layer.

The first layer serves several purposes. It lowers the friction between the sandwich material and the goods which strike against the material or for example a conveyor belt sliding against it. In increases the wear resistance of the material and it allows impact energy to penetrate into and be absorbed by the elastic rubber layers. Among other things, it is important in this context that the surface layer not absorb the impact energy itself, as this would result in a fast break-down of the surface layer, in other words said first layer. Said layer should therefore preferably consist substantially of solid polyurethane, which has proven to have surprising properties when combined with the two rubber layers of different hardness.

To decrease the friction one or several friction-lowering substances should be mixed with the polyurethane. It is preferable to let polytetrafluoroethylene in powder form be dissolved in or mixed with the polyurethane layer before it has set. A polytetrafluorethylene material marketed by DuPont as DLX-6000 is suitable, and at least 10% by weight should be added, preferably 15-25%. It is also possible to use graphite in concentrations of between 5 and 20% by weight. Both these types of additives increase the hardness of the polyurethane layer. Other possible additives for lowering the friction are silicon oil and polyethylene powder.

The thicknesses of the different layers as well as the relations of the thicknesses to each other also have a significant in regard to the optimal combination of properties of the material. These characteristics of the invention will become apparent from the attached patent claims.

The polyurethane may be applied onto the rubber layers, which have been joined in advance, by spraying either cold curing or hot curing two component type polyurethane or by pouring on mouldable, hot curing polyurethane. The friction-lowerng additive/s is/are admixed simultaneously with spraying or moulding.

A suitable two component type cold curing polyurethane is manufactured by Irathane International Ltd, Great Britain, and marketed as Irathane 155. This is a yellow plastic with a density of 1.04 g/cm$^3$ and a viscosity of 1200 cps (at 25° C.). The properties of the cold curing material are as follows:

Rupture strength (ASTM D412-68 Dica)—232 kg/cm$^2$

Tearing strength (ASTM D624-54 Dica)—45 kg/cm$^2$

Cleavage strength (ASTM D470-68 SPLIT)—16 kg/cm$^2$

Rupture strain (ASTM D412-68 Dica)—275%

Hardness (ASTM D2240-68)—90°-92° Shore A

Adhesitivity (ASTM D429 Method B)—12 kg/cm$^2$

Wear resistance (Taber Index, 17-18 wheels, 1000 g weight)—70 mg

This material is composed of a polymeric component (Irathane P 155) and a hardener (Irathane C 155). The former is an isocyanate terminated prepolymer solution and the latter an aromatic diamine solution. Suitable mixing proportions are 1:1 by volume, setting time: 3h; 100% curing time: 2 days at 25° C. By the admixing of hard friction-lowering additives, such as polytetrafluoroethylene or graphite, the hardness may be increased another few degrees Shore A. The exact value has not been determined, but the hardness after adding 20% PTFE is estimated at about 95° Shore A. The colour is also affected by these additions. This effect may be amplified by the addition of pigment.

Among useful mouldable cold curing polyurethanes those marketed as Irathane 202 and Irathane 205 (manufactured by the above mentioned company) may be suggested. They are composed of an Isocyanate Terminated Prepolymer and an Aromatic Amine Blend.

Among possible hot curing polyurethanes one with a hardness of between 90° and 100° Shore A may be suggested among those marketed as Aldepren, Vulcolan, Tricolan and Sampolan.

The polyurethane layer may in turn consist of two or more strata. A bottom stratum might consist of homogenous polyurethane according to one of the above descriptions without any additives to lower friction, while a—preferably thicker—surface wear stratum would consist of polyurethane with some friction-lowering component and colour pigment added. This would have some important advantages. Finally, the inner stratum of polyurethane will adhere well both to the upper wear layer and to the rubber layer below. The intermediate polyurethane stratum in other words improves the adhesion between the wear layer, containing one or several friction-lowering additives, and the rubber layer underneath, said adhesion at least in the case of application by spraying being weak. Secondly, the distinctly different colour of the second polyurethane stratum from that of the upper wear stratum gives an indication that the wear layer has been severly abraded, when the colour of the second stratum begins to show on the surface. Thirdly, the lower polyurethane stratum is somewhat softer than the upper wear stratum, and therefore contributes to the successive "deescalation of hardness" of the material as viewed from the outside of the wear layer. It is possible to let the intermediate stratum, i.e. the stratum between the upper wear stratum and the top layer of the rubber layers, consist of some other polymeric substance than polyurethane, such as polyethylene, but it is preferably of the same basic composition as the outer wear stratum.

The rubber layers may consist of either synthetic rubber or natural rubber. The harder rubber layer closest to the layer strata of polyurethane is preferably made of "synthetic natural type tread rubber" (styrene-butadiene rubber), e.g. that rubber which is manufactured by Semperit AG, Austria, and marketed as SEMPERIT 60 (with a hardness of 60° Shore A). The lower, softer, rubber layer preferably consists of a natural rubber mixture.

When the thickness of the laminate is great (total thickness ≧50 mm) it may also be suitable to apply a layer of wear type rubber on the underside of the softer rubber layer. This additional layer may be of the same type and have the same hardness as the intermediate rubber layer adjoining the polyurethane layer but be considerably thinner. The purpose of this lower wear type rubber layer is to improve the adhesion of the composite material to a substrate, which usually is a metal surface.

Further advantages and aspects of the invention will become apparent from the following description of some preferred embodiments.

BRIEF DESCRIPTION OF DRAWINGS

In the following description, reference will be made to the attached drawings, of which FIG. 1 is a perspective view, schematically illustrating how the sandwich material according to the invention may be used as a shock-absorbing element underneath a conveyor belt;

FIG. 2 is a sectional view of a sandwich material according to the invention; and FIG. 3 is a sectional view of a shock-absorbing element as depicted in FIG. 1.

DESCRIPTION OF PREFERRED EMBODIMENTS

Referring to FIG. 1, a conveyor belt is designated 1 and a hopper 2. Two sets of supporting rollers have been designated 3. Between the supporting rollers 3 there are a number of parallel, longitudinal supporting elements in the form of beams 4, covered with a shock-absorbing sandwich material according to the invention. FIG. 3 is a sectional view of such a supporting element 4. The supporting elements 4 rest on transverse beams 5, carried by stands 6.

The sandwich material according to the invention in its embodiments according to FIGS. 2 and 3 consists of four or five layers, viz a first polyurethane stratum (a wear stratum) 12 with a hardness of about 95° Shore A, a second polyurethane stratum (an intermediate stratum) 13 with a hardness of 90°–92° Shore A, a first rubber layer 9 with a hardness of 60° Shore A and a bottom rubber layer 10 with a hardness of 40° Shore A. The sandwich material may also have yet another rubber layer 14 at the bottom with the same hardness, 60° Shore A, as the rubber layer 9 in order to improve adhesion to the carrier structure 11, which may consist of a steel beam.

The wear stratum 12 contains one or several components to reduce friction. The intermediate stratum 13 is of a colour which distinctly differs from that of the wear stratum 12. When enough of the wear stratum 12 has worn off to permit the colour of stratum 13 to shine through, this is a signal that the wear stratum 12 needs reconditioning. This is easily accomplished by spraying on a new cover 12 of polyurethane. To provide the desired adhesion of the wear layer 12 to the underlying layers, the intermediate stratum 13 need only be very thin. The desired signal effect does not require that the stratum 13 be thick, either, but on the other hand the intermediate stratum 13 must not be made too thin, if the sandwich material is to keep enough of its desired properties of resilience and shock absorption, even as the wear stratum 12 wears down to the point where the stratum 13 is beginning to show.

The thicknesses of the layers or strata, 12, 13, 9, and 10 are determined according to the intended use of the material. When intended to be used where the strain on the material is exceedingly great, as is often the case within the ore industry, a thicker material is used than when the strain on the material is less. The following table presents some suitable combinations of layer thicknesses.

TABLE 1

| Combination | Layer 12 PU + PTFE ~95° Shore A mm | Layer 13 PU 90-92° Shore A mm | Layer 12 + 13 mm | Layer 9 Rubber 60° Shore A mm | Layer 10 Rubber 40° Shore A mm | Layer 14 Rubber 60° Shore A mm |
|---|---|---|---|---|---|---|
| I | 2.2 | 0.8 | 3 | 5 | 10 | — |
| II | 3.5 | 1.5 | 5 | 10 | 15 | — |
| III | 5.5 | 2.5 | 8 | 15 | 35 | 5 |
| IV | 7 | 3 | 10 | 20 | 45 | 5 |

EXAMPLE 1

A sandwich material with the layer thicknesses according to combination I of Table 1 had a lower rubber layer 10 of a natural rubber mixture of 40° Shore A. The rubber layer 9 consisted of a mixture of styrene-butadiene rubber (SEMPERIT ECO 60) of 60° Shore A. Onto the laminated rubber layers was first sprayed a comparatively thin stratum 13 of a cold curing two component polyurethane, type Irathane ® 155, the characteristics of which were presented above, and thereonto a thicker surface layer 12 of the same polyurethane quality, Irathane ® 155 but with an addition of 20% volume of friction-lowering PTFE powder, type DuPont ® DLX-600 and of colour pigment colouring the layer 12 clear red. After curing, the layers or strata 13 and 12 had hardness values of 90°-92° Shore A and about 95° Shore A, respectively.

EXAMPLE 2

This example refers to a material composed according to combination II. Table 1. The extra layer 14 of wear rubber consisted of the same rubber quality, SEMPERIT ® ECO 60, of 60° Shore A, as the layer 9. Otherwise the different layers were as in EXAMPLE 1.

In order to determine the importance of the polyurethane layers 12, 13, sandwich rubber with and without polyurethane layers was tested for impact resilience. Impact resilience is defined as the quotient of energy retained after rebound over energy before impact and is presented as a percentage value.

TABLE 2

| Composition of the sandwich rubber | Impact resilience without polyurethane/with polyurethane | |
|---|---|---|
| 5 mm rubber 60° Shore<br>10 mm rubber 40° Shore | 41% | 44% |
| 10 mm rubber 60° Shore<br>5 mm rubber 40° Shore | 32% | 37% |

It is evident that the best impact resilience is obtained with a sandwich rubber material, covered with polyurethane, the harder rubber layer closest to the polyurethane layer being thinner than the softer rubber layer underneath. The shock insulation ability of the material has also been determined. Shock insulation is a function of the resonance frequency and the impact frequency of the system. The resonance frequency is defined by the following equation:

$$ne = \frac{1}{2}\sqrt{\frac{9.81 \times E}{P}}$$

where E is the modulus of elasticity, which may also be expressed as spring rate, and P is the mass of the falling body as it contacts the bed, expressed in N.

The impact frequency, ns, is a function of the speed of the goods at the moment of impact. Insulation is defined according to the following equation:

$$T\% = 1 - \left[\frac{1}{\left(\frac{ns}{ne}\right)^2 - 1}\right]$$

The equations show that insulation is better if the material is soft and if it accepts a great spring loading distance. According to the equations, pure 40° Shore A rubber would provide the best insulation. This material is not sufficiently wear resistant, however. The friction drag of such a material for example as a coating for supporting elements for a conveyor belt against the soft rubber belt would also be too great. A soft rubber covered with a wear layer of polyurethane would not function either, since the polyurethane layer would be subjected to stretching beyond its stress limit and would break. Such extensive stretching would also cause a separation of the polyurethane layer from the soft rubber. The multi-layer material according to the invention, however, provides an ideal absorbtion and distribution of each blow.

We claim:

1. A shock absorbing and resilient composite comprising a first layer of predetermined thickness consisting essentially of a polymeric substance having a hardness of between 85° and 100° Shore A; a second layer of predetermined thickness consisting essentially of a rubber having a hardness of between 50° and 70° Shore A, but softer than said first layer; and a third layer of predetermined thickness consisting essentially of a rubber having a hardness of between 20° and 50° Shore A, but softer than said second layer; said second layer disposed between said first and said third layers; said second layer having a thickness greater than or equal to the thickness of said first layer and less than or equal to three times the thickness of said first layer; said third layer having a thickness greater than or equal to the thickness of said second layer and less than or equal to three times the thickness of said second layer.

2. The shock absorbing and resilient composite according to claim 1, wherein said first layer consists of polyurethane admixed with 5—30% by volume of at least one friction-lowering substance and said first layer has a hardness of at least 90° Shore A.

3. The shock absorbing and resilient composite according to claim 2, wherein said at least one friction-lowering substance is selected from the group consisting of polytetrafluoro-ethylene, polyethylene, graphite and silicone oil.

4. The shock abosrbing and resilient composite according to claim 3, wherein said first layer contains 10–25% by volume of polytetra-fluoroethylene.

5. The shock absorbing and resilient composite according to claim 1, further comprising a fourth layer of predetermined thickness consisting essentially of a polymeric substance having a hardness of between 70° and 90° Shore A, said fourth layer being disposed between said first and second layers, said fourth layer being adherent to said first and second layers.

6. The shock absorbing and resilient composite according to claim 5, wherein said fourth layer consists of polyurethane.

7. The shock absorbing and resilient composite according to claim 1, wherein said second layer is between 1.5 and 3 times as thick as said first layer, and said third layer is between 1.5 and 3 times as thick as said second layer.

8. The shock absorbing and resilient composite according to claim 7, wherein the sum of the thicknesses of said second and third layers is between 3 and 8 times the thickness of said first layer.

9. The shock absorbing and resilient composite according to claim 5, wherein said second layer is betwen 1.5 and 3 times as thick as the total thickness of said first and fourth layers, and said third layer is between 1.5 and 3 times as thick as said second layer.

10. The shock absorbing and resilient composite according to claim 9, wherein the sum of the thicknesses of said second and third layers is between 3 and 8 times the total thickness of said said first and fourth layers.

11. The shock absorbing and resilient composite according to claim 10, wherein the total thickness of said first and fourth layers is between 2 and 10 mm, the thickness of said second layer is between 4 and 25 mm, and the thickness of said third layer is between 8 and 50 mm.

12. The shock absorbing and resilient composite according to claim 1, wherein the hardness of said second layer is between 55° and 65° Shore A, and the hardness of said third layer is between 35° and 45° Shore A.

13. The shock absorbing and resilient composite according to claim 1, further comprising a fifth layer consisting essentially of a rubber having substantially the same hardness as said second layer and being no thicker than said first layer, said fifth layer being disposed so that said third layer is sandwiched between said second and fifth layers.

14. The shock absorbing and resilient composition according to claim 5, wherein said first and fourth layers are of distinctly different colors.

15. A shock absorbing element to be arranged under a conveyor belt at the area of loading comprising a carrier provided with a shock absorbing coating facing the bottom side of the conveyor belt; said shock absorbing coating comprising a first layer of predetermined thickness consisting essentially of a polymeric substance having a hardness of between 85° and 100° Shore A, a second layer of predetermined thickness consisting essentially of a rubber having a hardness of between 50° and 70° Shore A, but softer than said first layer, and a third layer of predetermined thickness consisting essentially of a rubber having a hardness of between 20° and 50° Shore A, but softer than said second layer, said second layer disposed between said first and third layers, said second layer having a thickness greater than or equal to the thickness of said first layer and less than or equal to three times the thickness of said first layer, said third layer having a thickness greater than or equal to said second layer and less than or equal to three times the thickness of said second layer; said third layer adjacent said carrier.

* * * * *